Sept. 28, 1943.   L. J. MEYER   2,330,605
MACHINE FOR WASHING AND STEAMING EDIBLE NUTS
Filed April 27, 1942    2 Sheets-Sheet 1

INVENTOR.
LEO J. MEYER
BY
ATTORNEY

Sept. 28, 1943.    L. J. MEYER    2,330,605
MACHINE FOR WASHING AND STEAMING EDIBLE NUTS
Filed April 27, 1942    2 Sheets-Sheet 2
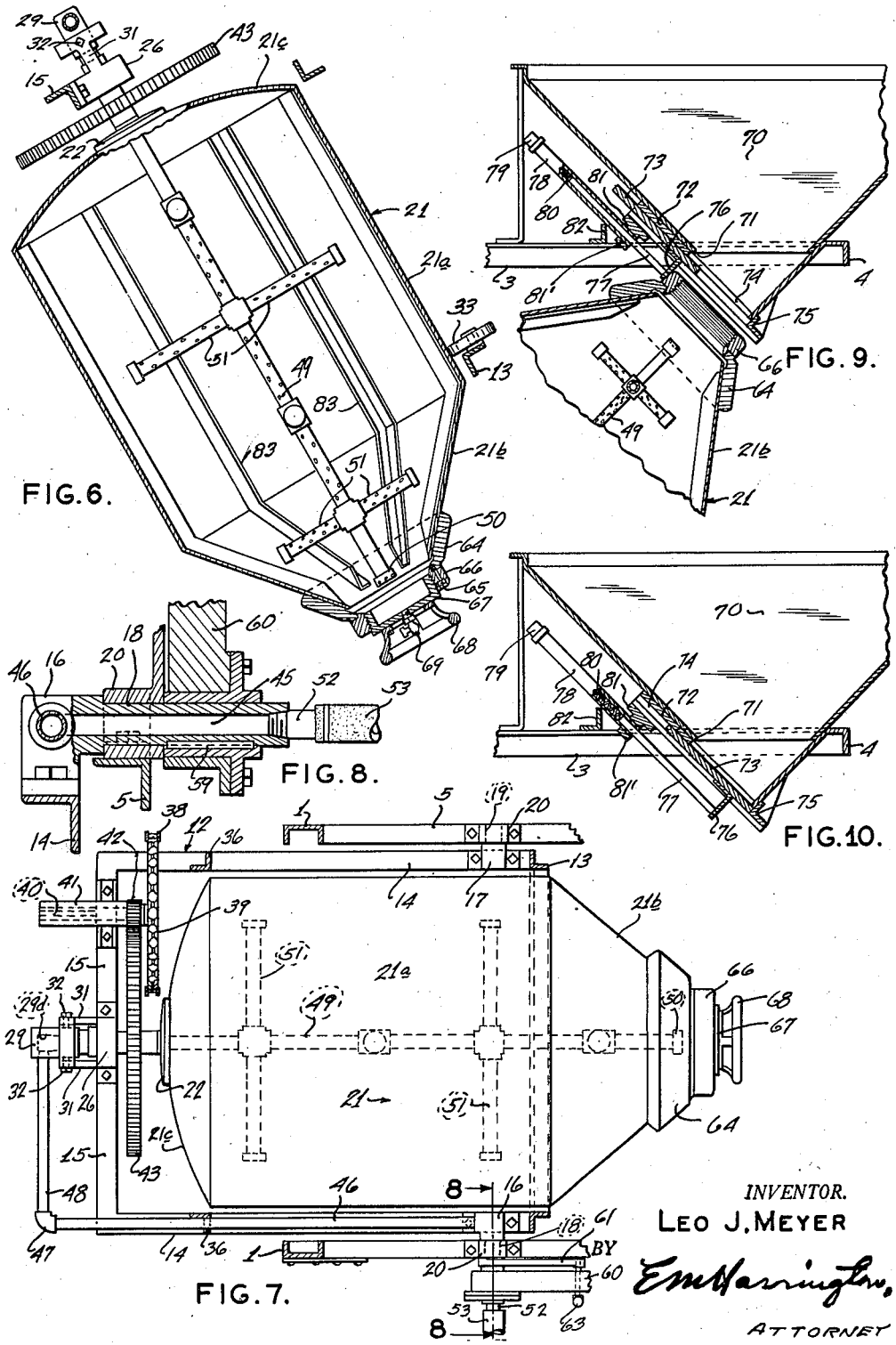
INVENTOR.
LEO J. MEYER
ATTORNEY Patented Sept. 28, 1943

2,330,605

UNITED STATES PATENT OFFICE 2,330,605

MACHINE FOR WASHING AND STEAMING EDIBLE NUTS

Leo J. Meyer, San Antonio, Tex., assignor to The Champion Pecan Machine Company, San Antonio, Tex., a corporation of Texas Application April 27, 1942, Serial No. 440,638

7 Claims. (Cl. 146—197)

This invention relates generally to machines for preparing pecans and other edible nuts for shell-cracking operations, and more specifically to an improved machine for washing and for steaming and humidifying edible nuts in order to remove mud and other foreign matter from the surfaces of the shells of the nuts and for preparing the nuts so as to facilitate separation of the shells from the meats of the nuts when the nuts are subsequently subjected to shell-cracking operations, the predominant object of the invention being to provide a machine of this type, which because of its unique and improved construction and arrangement, is capable of performing its intended function in an improved and highly efficient manner.

Fig. 6 is an enlarged, longitudinal section taken on line 6—6 of Fig. 2, only the drum and closely associated parts of the machine being illustrated.

Fig. 7 is an enlarged view partly in elevation and partly in section taken on line 7—7 of Fig. 1.

Fig. 8 is an enlarged, fragmentary section taken on line 8—8 of Fig. 7.

Fig. 9 is a fragmentary, vertical section taken through the hopper and a portion of the drum of the machine.

Fig. 10 is a vertical section taken through the hopper of the machine but showing the closure member of said hopper in a closed position.

Figure 1:
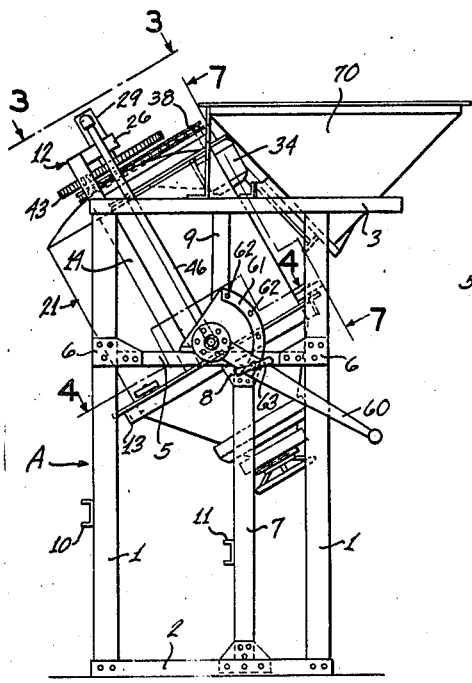
Fig. 1 is a side elevation of the improved machine of this invention.

In the drawings, wherein is shown for the purpose of illustration, merely, one embodiment of the invention, A designates the improved machine generally. The machine A comprises a supporting frame which includes four upright corner members 1 disposed in rectangular relation, said upright members having secured thereto at their lower ends suitable base members 2 which rest upon the floor or other support by which the machine is supported. At the upper ends thereof the upright members 1 have secured thereto an upper frame portion which comprises a pair of opposed side members 3 which are joined at their forward ends by a front member 4, said upper frame portion being extended forwardly beyond the positions of the forward, upright frame members 1, as is shown to the best advantage in that Fig. 1. The frame of the machine A includes, also, a pair of opposed, horizontal members 5 which are secured to the pairs of upright members 1 at opposite sides of the machine through the instrumentality of suitable tie plates 6, and opposed, vertically disposed members 7 are arranged at opposite sides of the frame of the machine and are secured at their lower and upper ends to the base members 2 and horizontal members 5 by suitable tie plates 8. Additionally, the frame of the machine includes opposed, vertical members 9 which extend between and are secured to the side members 3 of the upper frame portion and the opposed horizontal members 5, and tie elements 10 and 11 are provided which tie together, respectively, the opposed, rear upright members 1 and the opposed vertical members 7.

Supported for rocking movement by the main frame of the machine is a cradle 12 which includes at its forward end an annular member 13 formed from an appropriately shaped angle bar. Welded or otherwise secured to the annular member 13 at their forward ends, and extended rearwardly therefrom, is a pair of opposed, angle bar members 14 which are joined at their rear ends by a similar angle bar member 15 (Fig. 7). The cradle 12 is supported for rocking movement by the main frame of the machine A through the instrumentality of elements 16 and 17 which are located at opposite sides of the machine and are bolted or otherwise secured to the opposed members 14 of the cradle. The elements 16 and 17 are provided with outwardly extended trunnions 18 and 19 which are disposed for rotary movement in the bores of suitable bearing members 20 which are bolted or otherwise secured to the opposed, horizontal members 5 of the main frame of the machine, whereby said cradle may be subjected to pivotal movement relative to the main frame of the machine.

The cradle 12, supports a drum 21 for rocking movement therewith and for rotary movement with respect thereto, said drum being provided with a main annular wall 21a, a tapered forward wall portion 21b, and a bowed rear wall portion 21c formed integral to provide a unitary drum structure (Fig. 6). The drum 21 has welded or otherwise secured to its rear wall 21c a flanged element 22 which is provided with a rearwardly extended trunnion 23 (Fig. 5) which has a passageway 24 formed longitudinally therethrough, said passageway communicating at its inner end with an enlarged, screwthreaded opening 25 of tapered formation, formed in the inner portion of said element 22, and being open at the outer end of the trunnion 23 of said element 22. The trunnion 23 is supported for rotation by a bearing member 26 which is bolted to the rear cross member 15 of the cradle 12, said bearing member 26 having associated therewith and within same a ball bearing assembly 27 which provides, in an obvious manner, for free rotation of the trunnion 23 within the bearing member 26.

Figure 5:
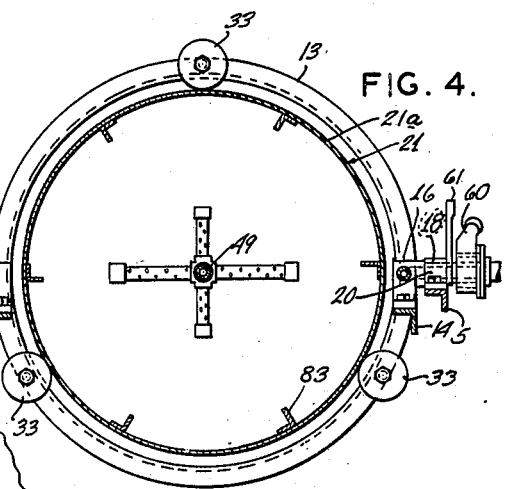
Fig. 5 is an enlarged, fragmentary section taken on line 5—5 of Fig. 3.

Arranged in embracing relation with respect to a portion of the trunnion 23 is a sleeve 28 which is externally screwthreaded and abuts against the bearing member 26, as shown in Fig. 5. The sleeve 28 has associated therewith an outer head 29 which is closed at its rear end by a wall 29a and is provided with a circumferential wall 29b on which an inwardly extended, annular rib 29c is formed. The inner face of the annular rib 29c contacts with the outer surface of the trunnion 23 and the forward portion of the circumferential wall of the head 29 is internally screwthreaded and said screwthreads screwthreadedly engage the external screwthreads of the sleeve 28. Arranged within the head 29 in a cavity defined by a portion of the inner face of the circumferential wall of said head, an adacent surface portion of the trunnion 23, the rear end portion of the sleeve 28, and the rib 29c, is a body of packing material 30 which may be compressed by rotation of the head 29 in the manner of a stuffing box to prevent passage of liquid longitudinally of the trunnion 23 at the outer surface thereof. The head 29 is supported, and unintended rotation thereof is prevented, by a plurality of arms 31 which extend rearwardly from the bearing member 26 and are provided with set screws 32 whose inner end portions are seated in suitable openings formed in said head.

Figures 3, 4:
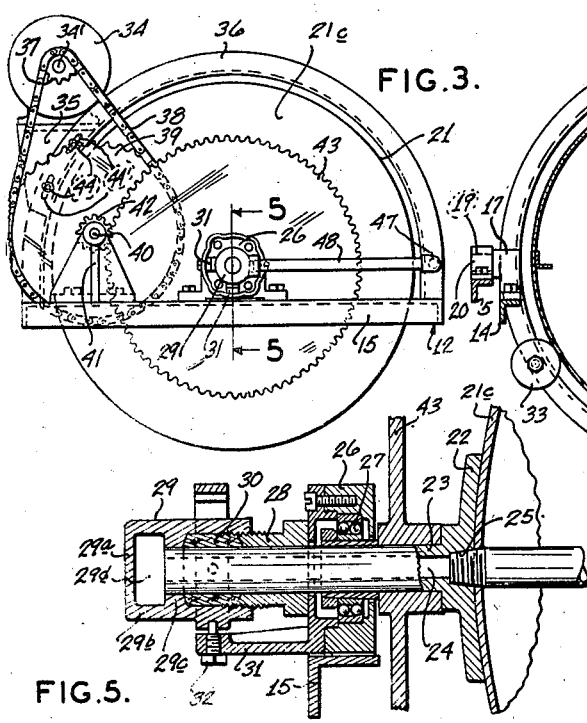
Fig. 3 is an enlarged plan view taken on line 3—3 of Fig. 1.
Fig. 4 is an enlarged section taken on line 4—4 of Fig. 1.

The forward portion of the drum 21 is supported by the cradle 12 for rotary movement by a plurality of rollers 33 which are supported for rotation on studs which are extended from the forward, annular member 13 of said cradle, the peripheral faces of the rollers contacting with the circumferential face of the wall 21a of the drum. The rollers are preferably arranged, as is shown to the best advantage in Fig. 4, so as to provide three point rolling support for the drum 21, and because of the presence of such rollers and the ball bearing support provided for the trunnion 23 of the drum by the bearing member 26, said drum may rotate freely about its longitudinal axis with respect to the cradle 12. For the purpose of subjecting the drum 21 to rotary movement with respect to the cradle 12 an electric motor 34 is provided which is supported by a suitable bracket 35 that is secured to an arcuate member 36 which is welded or otherwise secured to the opposed side members 14 of the cradle 12. The motor 34 has fixedly mounted on the power shaft 34' thereof a sprocket pinion 37 over which a sprocket chain 38 operates, said sprocket chain operating also over a relatively large sprocket wheel 39 that is fixedly mounted on a shaft 40 which is supported for rotation by an elongated bearing 41 (Fig. 7). The shaft 40 has fixedly mounted thereon also a gear pinion 42 which meshes with a relatively large gear wheel 43 that is fixedly mounted on the trunnion 23 as shown in Figs. 5 and 7.

It is obvious that rotary motion is transmitted from the motor 34 to the shaft 40 through operation of the sprocket chain 38 over the sprocket pinion 37 and the sprocket wheel 39. Likewise rotary motion is transmitted from the shaft 40 to the trunnion 23 through cooperative action of the gear pinion 42 and the gear wheel 43 to rotate the drum 21 about its longitudinal axis with respect to the cradle 12. Also it is plain that because of the relative diameters of the sprocket pinion 37 and the sprocket wheel 39, and of the gear pinion 42 and the gear wheel 43, the speed of rotation of the drum 21 is reduced substantially with respect to the speed of operation of the motor 34. Additionally the bracket 35 which supports the motor 34 is secured to the arcuate member 36 by bolts 44 which extend through apertures formed through said arcuate member 36 and through elongated slots 44' formed through portions of the bracket 35. Because of this arrangement the bracket 35 and the motor 34 may be adjusted upwardly when it is desired to tighten the sprocket chain 38.

Figure 2:
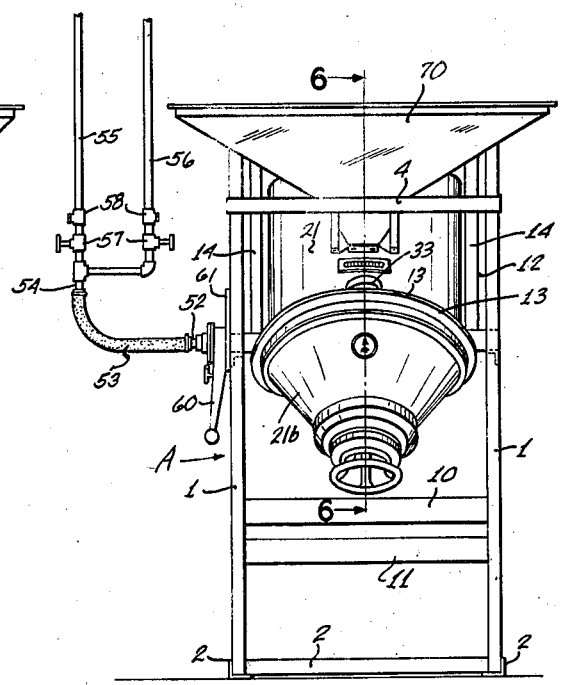
Fig. 2 is a front elevation of the machine illustrated in Fig. 1.

The trunnion 18 which aids in pivotally supporting the cradle 12 with respect to the main frame of the machine A has formed longitudinally therethrough a passageway 45 (Fig. 8) which extends into the associated element 16 and is open at the outer end of said trunnion. The element 16 has connected thereto a pipe 46 which communicates with the passageway 45 of said element 16 and the trunnion 18 associated therewith, and this pipe has connected thereto by an elbow fitting 47 a pipe 48 which is connected into the head 29 so as to communicate with the cavity 29d therein. Likewise, the drum has arranged therein a perforated pipe 49 whose rear end portion is screwed into the tapered screwthreaded opening 25 at the inner end of the element 22 (Fig. 5) so as to be in communication with the passageway 24 of said element, said pipe 49 being extended longitudinally of said drum at the approximate longitudinal axis thereof. The pipe 49 is closed at its forward end by a cap 50 which also may be perforated if desired, and connected to said pipe 49 by suitable fittings and extended laterally therefrom is a plurality of perforated pipes 51 that are capped at their outer ends, the forwardmost laterally extended pipes 51 being of shorter length than the other lateral pipes because of the tapered formation of the corresponding end of the drum 21. Screwthreadedly connected to the outer end portion of the trunnion 18, in communication with the passageway 45 thereof, is a short section of pipe 52 to which is connected a section of hose 53, the opposite end of said hose being connected to a section of pipe 54 (Fig. 2). Arranged in communication with the section of pipe 54 is a steam supply pipe 55 and a water supply pipe 56, each of said pipes 55 and 56 having associated therewith a hand-operated controlling valve 57 and a check valve 58.

Supported by the trunnion 18 and fixed thereto by means of a key 59 (Fig. 8) is an operating handle 60 which serves the function of rocking the cradle 12 with respect to the main frame of the machine. Because the handle 60 is fixedly secured to the trunnion 18, and because the elements 16 and 17 are secured to the opposed members 14 of the cradle, arcuate movement of the outer portion of the handle will cause the trunnions 18 and 19 to rotate within the bearing members 20 secured to the opposed, horizontal members 5 of the main frame of the machine with the result that the entire cradle 12, and the drum and other parts of the machine supported by said cradle, will be subjected to pivotal movement about said bearing members 20. Also, in order to lock the cradle 12 in various positions to which it is adjusted with the aid of the handle 60, the bearing member 20 located adjacent to said handle is provided with a fixedly supported plate 61 which is provided with a plurality of apertures 62 arranged in spaced, arcuate relation. Additionally, the handle 60 supports a locking pin 63 which is disposed in an aperture formed through said handle, and the inner end portion of said locking pin may be introduced into an appropriate aperture 62 of the plate 61 when the cradle has been adjusted with the aid of the handle in order to retain the cradle in the position to which it has been adjusted.

Fixed to the tapered wall 21b of the drum 21 at the outer end of said tapered wall is a tapered annular member 64 of heavy cross-section to which is fixed by suitable fastening devices 65 a collar 66 which is internally screwthreaded and is likewise of heavy cross-section. The collar 66 screwthreadedly receives an externally screwthreaded closure member 67 which serves to close the opening at the tapered end portion of the drum 21. The closure member 67 has fixed thereto an element 68 which is adapted to facilitate rotation of said closure member in screw-threadedly seating or unseating same, said element 68 including a base portion which is suitably secured to the closure member, an outer, annular hand grip, and spaced arms for connecting said hand grip to said base portion. Also, the closure member 67 is provided with a screwthreaded aperture formed through the outer wall thereof which receives a pet cock 69 that serves a purpose to be hereinafter set forth.

Supported by the side members 3 and the forward member 4 at the upper end of the main frame of the machine A is a hopper 70 which is open at its top and is provided with wall portions that incline downwardly and inwardly from the margin of said open top of the hopper to a point at the bottom of said hopper at which a discharge opening 71 is provided. The hopper 70 has fixed thereto at the location of the discharge opening 71 a guide member 72 which supports for sliding movement a closure 73 which is in the form of a flat plate that is adapted for movement to a position where it closes the discharge opening 71 of the hopper and to a position where said hopper opening is open for passage of nuts therethrough from the hopper. The guide member includes a wall portion which is disposed against a portion of the wall of the hopper, this wall portion of the guide member having an opening 74 formed therethrough which coincides with the discharge opening 71 of the hopper, and opposed side portions of the guide member being shaped to embrace opposed side edge portions of the closure member 73 so as to support same for sliding movement. Also, the hopper has fixed thereto an angular abutment 75 which limits forward movement of the closure member 73, and said closure member has secured thereto an angular element 76.

Fixed to the angular element 76 and projected therefrom is a rod 77 which is extended into a tubular member 78, said tubular member being closed at one of its ends by a suitable cap 79 and a coil spring 80 being interposed between said cap and the adjacent end of the rod 77. The tubular member 78 is supported by a member 81 which is fixed to the closure member embracing portions of the guide member 72, said member 81 having an extension 81' in which an opening is formed that fixedly receives an end portion of said tubular member 78 as shown in Fig. 9. The support of the tubular member 78 is aided by an angular element 82 which is supported by and extends from one to the other of the side members 3.

In describing the operation of the improved machine it will be assumed that the drum 21 is in the position in which it is shown in Fig. 1 and that the closure member 67 is removed from the opening at the outer end of the tapered portion of said drum. It will be assumed also that the hopper has received the nuts which are to be introduced into the drum of the machine and that the closure member 73 of the hopper is in a closed position. With the situation as outlined above prevailing, the operator of the machine will rotate the handle 60 in the appropriate direction to rotate the drum 21 about its trunnions 18 and 19 so as to cause the tapered end portion of said drum to swing upwardly in an arc of a circle toward the position occupied by said tapered end portion in Fig. 9. As the tapered end portion of the drum approaches the position shown in Fig. 9, the collar 66 will contact with the angular element 76 which is fixed to the closure member 73 of the hopper 70, and as movement of the drum continues said angular element and the closure member to which it is fixed will be moved rearwardly to uncover the discharge opening 71 of the hopper and permit nuts contained within the hopper to pour into the interior of the drum whose opening by this time has been alined with the discharge opening of the hopper. The coil spring 80, which normally tends to retain the closure member 73 in the closed position with respect to the discharge opening of the hopper, is compressed by rearward movement of the angular element 76 and the closure member 73 in response to movement of the drum.

When the nuts have been transferred from the hopper to the interior of the drum 21, the handle 60 is rotated in the reverse direction to move the tapered portion of the drum downwardly away from the discharge opening of the hopper. As the tapered portion of the drum is moved away from the discharge opening of the hopper the coil spring 80 moves the closure member 73 of the hopper to its closed position with respect to the discharge opening of said hopper, and movement of the drum is stopped when the tapered portion of the drum has cleared the hopper to allow the operator to screw the closure member 67 of the drum into the opening at the outer end of the tapered portion of said drum. When the closure member of the drum has been arranged in place downward movement of said drum is continued until it reaches the position in which it is shown in Fig. 1.

The operator then opens the valve 57 associated with the water supply pipe 56 and water flows from said pipe 56 through the hose 53 into and through the passageway 45 formed in the trunnion 18 (Fig. 8). From the passageway 45 the water flows through the pipes 46 and 48 and into the cavity 29d of the head 29, said water passing from said cavity 29d through the passageway 24 formed through the trunnion 23 at the rear end of the drum (Fig. 5) and flowing into and through the perforated pipe assembly 49—51 within the drum for discharge therefrom into the interior of the drum, the pet cock 69 at this time being closed. Also, the electric motor 34 is set in operation to rotate the drum 21 about its major axis during which rotation of the drum the circumferentially spaced and longitudinally extended ribs 83, which are secured at the inner face of the wall of the drum, will tumble the nuts about within the drum and will agitate the water within said drum so as to effect washing of the nuts. When the washing operation has continued the proper length of time the motor 34 is stopped and the pet cock 69 is opened (the valve 57 of the water supply pipe having been previously closed) and the soiled water drains from the drum through said pet cock.

After the nuts have been washed as described above said nuts are subjected to a steaming and humidifying action which prepares the nuts for the shell-cracking operating to be subsequently performed. In subjecting the nuts within the drum 21 to the steaming and humidifying operation the valve 57 of the steam supply pipe 55 is opened thereby permitting steam to flow through the hose 53, passageway 45 of trunnion 18, pipes 46 and 48, cavity 29d of head 29, passageway 24 of trunnion 23, and pipe assembly 49—51 for discharge into the interior of the drum. The steam so discharged into the interior of the drum permeates the body of nuts therein subjecting them to the desired steaming and humidifying action, such steaming and humidifying action being continued for a predetermined period of time during which the pet cock 69 remains open so that there will be a passage of steam through the entire body of nuts to the steam-discharge point at which the pet cock is located. When the required steaming and humidifying period has elapsed the valve 57, which controls passage of steam into the drum, is closed, and thereafter the closure member 67 of the drum is removed, while the drum is in the position shown in Fig. 1, to permit the nuts to flow from the drum into a suitable receptacle arranged beneath the discharge opening thereof. During the period of steaming and humidifying the nuts contained within the drum of the machine, the operator refills the hopper 70 so that as soon as a steamed and humidified body of nuts has been discharged from the drum the operation of the machine as described above may be repeated.

If it should be desired to add moisture to steam being introduced into the drum of the machine during a steaming and humidifying operation, this may be done by opening the valve 57 of the water supply pipe 56 to the proper degree to permit the desired amount of water to flow with the steam into the drum.

I claim:

1. A machine for servicing edible nuts, comprising a main frame, a secondary frame supported by said main frame for pivotal movement with respect thereto, a drum supported by said secondary frame for rotary movement with respect thereto and having an opening for passage of nuts into and out of said drum, a closure member for said drum opening, means for subjecting said drum to rotary movement, a hopper fixedly supported by said main frame and having a discharge opening through which nuts may pass from said hopper, said hopper opening being located immediately adjacent to the path of movement traveled by the drum opening in response to pivotal movement of said secondary frame, a closure member for said discharge opening of said hopper, said drum being movable to a position where a portion thereof engages the closure member of the discharge opening of said hopper and moves same to its open position and where the opening of said drum coincides with the discharge opening of said hopper for passage of nuts from said hopper into said drum, and said drum being movable to a different position where nuts may be discharged from said drum through the opening thereof, and conducting means for discharging into said drum nut servicing medium.

2. A machine for servicing edible nuts, comprising a main frame, a secondary frame supported by said main frame for pivotal movement with respect thereto, a drum supported by said secondary frame for rotary movement with respect thereto and having an opening for passage of nuts into and out of said drum, a closure member for said drum opening, means supported by said secondary frame for subjecting said drum to rotary movement, a hopper fixedly supported by said main frame and having a discharge opening through which nuts may pass from said hopper, said hopper opening being located immediately adjacent to the path of movement traveled by the drum opening in response to pivotal movement of said secondary frame, a closure member for said discharge opening of said hopper, said drum being movable to a position where a portion thereof engages the closure member of the discharge opening of said hopper and moves same to its open position and where the opening of said drum coincides with the discharge opening of said hopper for passage of nuts from said hopper into said drum, and said drum being movable to a different position where nuts may be discharged from said drum through the opening thereof, and conducting means for discharging into said drum nut servicing medium.

3. A machine for servicing edible nuts, comprising a main frame, a secondary frame supported by said main frame for pivotal movement with respect thereto, a drum supported by said secondary frame for rotary movement with respect thereto and having an opening for passage of nuts into and out of said drum, a closure member for said drum opening, means supported by said secondary frame for subjecting said drum to rotary movement, a hopper fixedly supported by said main frame and having a discharge opening through which nuts may pass from said hopper, said hopper opening being located immediately adjacent to the path of movement traveled by the drum opening in response to pivotal movement of said secondary frame, a slidably supported closure member for said discharge opening of said hopper, said drum being movable to a position where a portion thereof engages the closure member of the discharge opening of said hopper and moves same to its open position and where the opening of said drum coincides with the discharge opening of said hopper for passage of nuts from said hopper into said drum, and said drum being movable to a different position where nuts may be discharged from said drum through the opening thereof, and conducting means for discharging into said drum nut servicing medium.

4. A machine for servicing edible nuts, comprising a main frame, a secondary frame supported by said main frame for pivotal movement with respect thereto, a drum supported by said secondary frame for rotary movement with respect thereto and having an opening for passage of nuts into and out of said drum, a closure member for said drum opening, means supported by said secondary frame for subjecting said drum to rotary movement, a hopper fixedly supported by said main frame and having a discharge opening through which nuts may pass from said hopper, said hopper opening being located immediately adjacent to the path of movement traveled by the drum opening in response to pivotal movement of said secondary frame, a slidably supported closure member for said discharge opening of said hopper, spring means for urging said closure member of the discharge opening of said hopper toward its closed position, said drum being movable to a position where a portion thereof engages the closure member of the discharge opening of said hopper and moves same to its open position and where the opening of said drum coincides with the discharge opening of said hopper for passage of nuts from said hopper into said drum, and said drum being movable to a different position where nuts may be discharged from said drum through the opening thereof, and conducting means for discharging into said drum nut servicing medium.

5. A machine for servicing edible nuts, comprising a main frame, a secondary frame supported by said main frame for pivotal movement with respect thereto, a drum supported by said secondary frame for rotary movement with respect thereto and having an opening for passage of nuts into and out of said drum, a closure member for said drum opening, means for subjecting said drum to rotary movement, a hopper fixedly supported by said main frame and having a discharge opening through which nuts may pass from said hopper, said hopper opening being located immediately adjacent to the path of movement traveled by the drum opening in response to pivotal movement of said secondary frame, a closure member for said discharge opening of said hopper, said drum being movable to a position where a portion thereof engages the closure member of the discharge opening of said hopper and moves same to its open position and where the opening of said drum coincides with the discharge opening of said hopper for passage of nuts from said hopper into said drum, and said drum being movable to a different position where nuts may be discharged from said drum through the opening thereof, and conducting means including a perforated pipe located within said drum for discharging into said drum nut servicing medium.

6. A machine for servicing edible nuts, comprising a main frame, a secondary frame supported by said main frame for pivotal movement with respect thereto, a drum supported by said secondary frame for rotary movement with respect thereto and having an opening for passage of nuts into and out of said drum, a closure member for said drum opening, means for subjecting said drum to rotary movement, a hopper fixedly supported by said main frame and having a discharge opening through which nuts may pass from said hopper, said hopper opening being located immediately adjacent to the path of movement traveled by the drum opening in response to pivotal movement of said secondary frame, a closure member for said discharge opening of said hopper, said drum being movable to a position where a portion thereof engages the closure member of the discharge opening of said hopper and moves same to its open position and where the opening of said drum coincides with the discharge opening of said hopper for passage of nuts from said hopper into said drum, and said drum being movable to a different position where nuts may be discharged from said drum through the opening thereof, and conducting means including an assembly of perforated pipes located within said drum for discharging into said drum nut servicing medium.

7. A machine for servicing edible nuts, comprising a main frame, a secondary frame supported by said main frame for pivotal movement with respect thereto, a drum supported by said secondary frame for rotary movement with respect thereto and having an opening for passage of nuts into and out of said drum, a closure member for said drum opening, means for subjecting said drum to rotary movement, a hopper fixedly supported by said main frame and having a discharge opening through which nuts may pass from said hopper, said hopper opening being located immediately adjacent to the path of movement traveled by the drum opening in response to pivotal movement of said secondary frame, a closure member for said discharge opening of said hopper, said drum being movable to a position where a portion thereof engages the closure member of the discharge opening of said hopper and moves same to its open position and where the opening of said drum coincides with the discharge opening of said hopper for passage of nuts from said hopper into said drum, and said drum being movable to a different position where nuts may be discharged from said drum through the opening thereof, conducting means for discharging into said drum nut servicing medium, and a water supply pipe and a steam supply pipe both of which communicate with said conducting means and form parts thereof.

LEO J. MEYER.